April 13, 1926.

E. SCHEIDIGGER

EGG BOILER

Filed April 22, 1925

INVENTOR.
Ernst Scheidigger
BY
Stuart C Barnes
ATTORNEY.

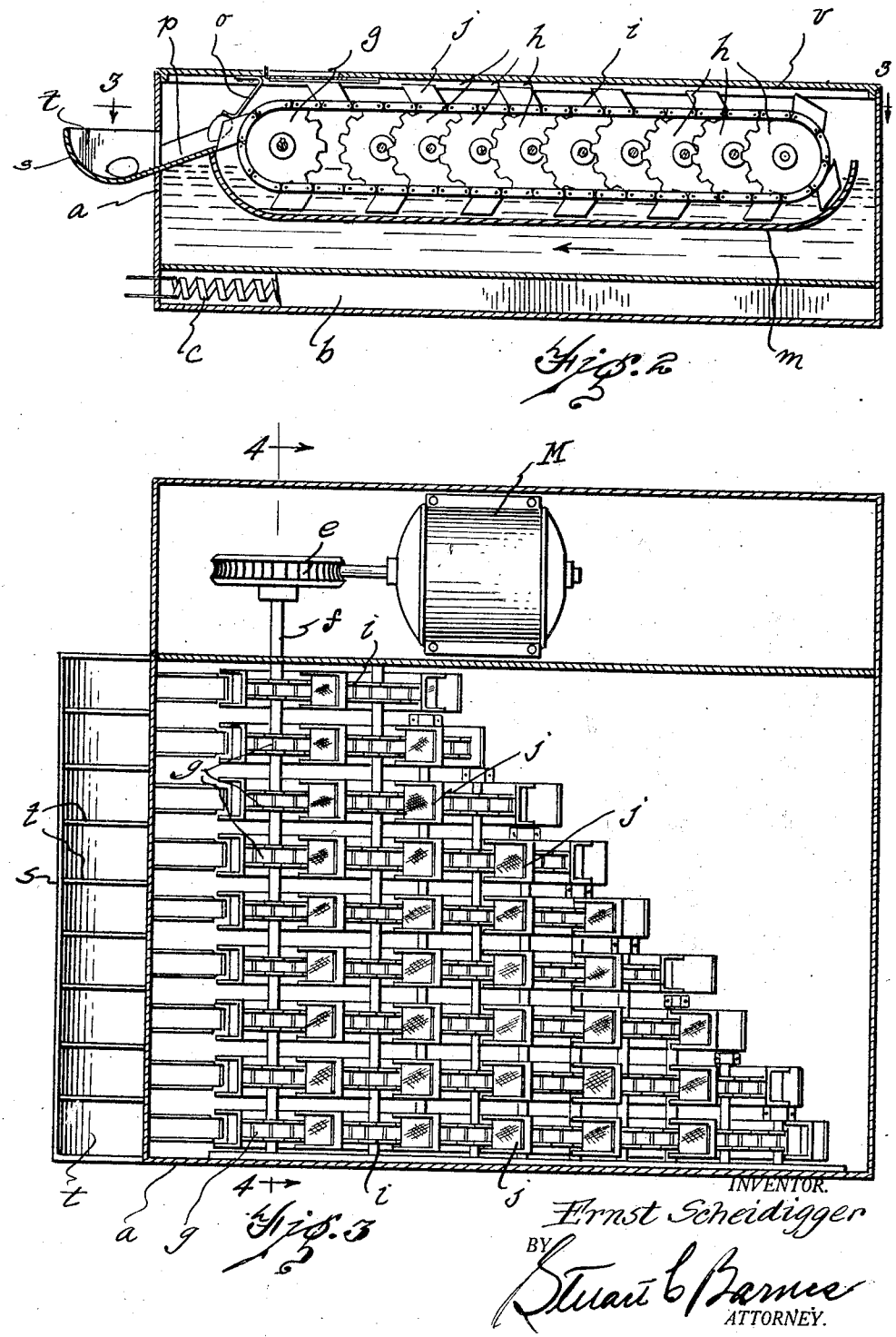

Patented Apr. 13, 1926.

1,580,684

UNITED STATES PATENT OFFICE.

ERNST SCHEIDIGGER, OF DETROIT, MICHIGAN.

EGG BOILER.

Application filed April 22, 1925. Serial No. 24,949.

*To all whom it may concern:*

Be it known that I, ERNST SCHEIDIGGER, a citizen of the United States, residing at Detroit, in the county of Wayne and State of Michigan, have invented certain new and useful Improvements in Egg Boilers, of which the following is a specification.

This invention relates to a device for boiling eggs, and has for its object the provision of means for regulating the time interval in which the eggs are exposed to the heating liquid.

The devices that are now used for boiling eggs for different time intervals have no means for maintaining the eggs which are boiled for different lengths of time separate from each other, and it is necessary to mark the eggs with an indelible pencil so that when the same are cooked one will know how long the eggs have been in the boiling water, as all the eggs are deposited in one place and confusion would result unless the eggs were marked in some way.

I have incorporated in my device means for separating eggs which are cooked for different lengths of time by depositing the same in separate compartments and as a result the eggs will not become mixed up. In addition I provide an improved means for boiling the eggs, for depositing the same into the device, and for delivering the eggs out of the cooker at the correct time.

In the drawings:

Fig. 2 is a section taken on the line 2—2 of Fig. 1.

Fig. 3 is a horizontal section taken on the line 3—3 of Fig. 2.

Figure 5:
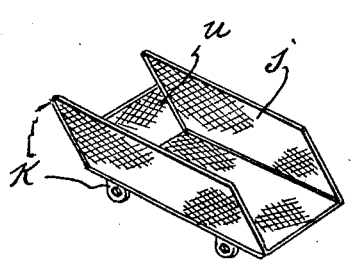
Fig. 5 is a detail in perspective of the egg carrier.

$a$ designates a container arranged to hold a liquid. This container is provided with the compartment $b$ in the bottom, in which is located an electric heating element $c$, but obviously a gas burner or other means for heating the liquid may be used. A motor M is located within the cabinet and drives the worm $d$, which in turn meshes with the worm gear $e$ for rotating the shaft at a relatively slow speed. If necessary, suitable transmission gears could be incorporated between the motor and the shaft $f$ to provide the desired speed. Keyed or otherwise secured to the shaft $f$ are a plurality of sprockets $g$ and obviously all these sprockets are driven at the same speed. Mounted to the rear of the sprockets $g$ are a number of idling sprockets $h$, and running over the sprockets $g$ and $h$ are the continuous chains or conveyers $i$. Secured to these conveyers are a number of egg carriers $j$ (see Fig. 5). These carriers may be secured to the chain in any suitable manner. I have shown the carriers provided with the ears $k$ which may be secured by a bolt, or other means, to the chains or conveyers.

The lower run of these conveyers is so located as to operate through the heating liquid contained within the container $a$, and carried by the container is the stationary trough $m$ so that when the carriers are carrying an egg through the heating liquid the egg is not permitted to drop out of the carrier, as the trough supports the eggs when they are pushed along by the carrier.

Figure 1:
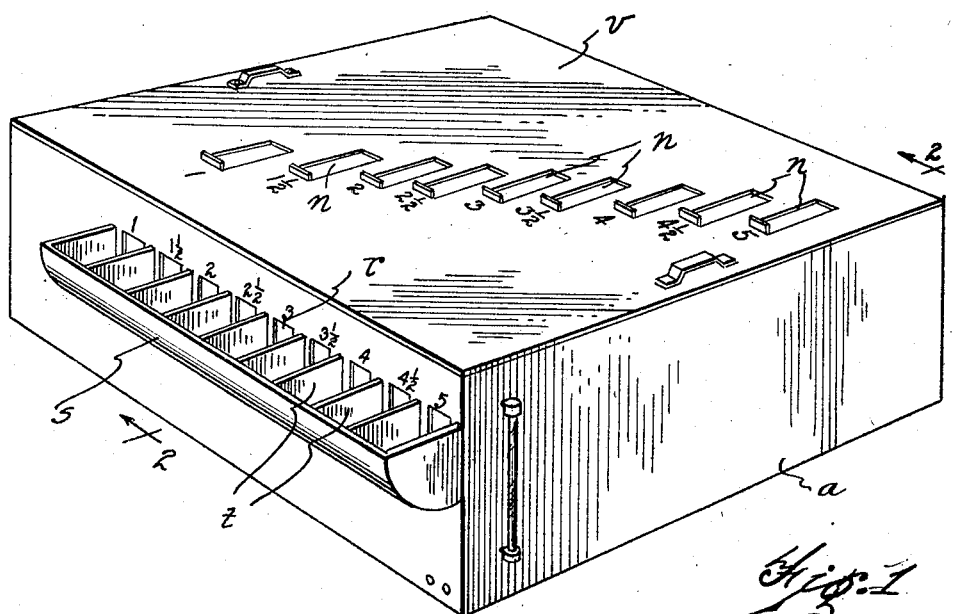
Fig. 1 is a perspective view of the device embodying my invention.
Figure 4:
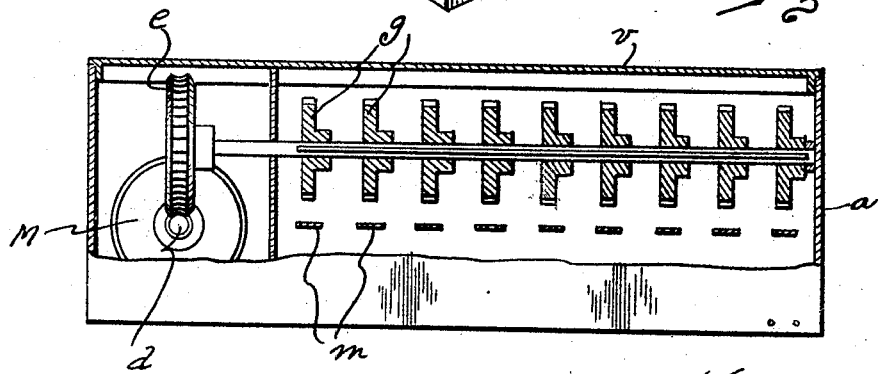
Fig. 4 is a vertical section taken on the line 4—4 of Fig. 3.

The eggs may be deposited into any one of these conveyers through the openings $n$. Referring to Fig. 1, it will be seen how these openings are numbered so as to designate the length of time which the egg will be run through the heating liquid or boiling water when deposited through any one of these openings. In this way the operator may drop the egg through the opening marked 3 if he desired the egg to be boiled for three minutes. The egg is pushed along by the carrier to the forward end of the cabinet and when the same is carried out of the boiling water the ejector arm $o$ is arranged to strike the egg and eject the same from out of the carrier into the downwardly inclined shoot $p$, thereby delivering the egg through the outlet openings $r$ into the trough $s$, which is divided up into a plurality of compartments $t$. These compartments are labelled to correspond with the markings on the inlet openings $n$, so the one who is cooking the eggs will know that any egg that is deposited in the compartment $t$ labelled 3, has been boiled for three minutes.

The carriers $j$ are provided with the short end wall at one end which does not rise to the full height of the side walls thereby permitting the ejector arm $o$ to project within the carrier for the purpose of ejecting the egg. The other end of the carrier is opened to the full height.

With such an apparatus there is no chance for the eggs becoming mixed because when an egg is placed through a certain opening it is delivered into the correct compartment which bears the identical label as the opening through which the egg was first deposited into the boiler.

The cabinet is provided with the cover $v$ so that access may be had into the interior of the cabinet for the purpose of filling the same or making adjustments that might be necessary.

What I claim is:

1. An egg boiler, having in combination a container for holding a heating liquid, and a plurality of endless conveying means for carrying eggs through said heating liquid, said conveying means being of various lengths and so arranged as to each convey an egg through said heating liquid for different periods of time.

2. An egg boiler, having in combination, a container for holding a heating liquid, a plurality of conveying means for carrying eggs through said heating liquid, said conveying means being of various lengths and arranged to convey the eggs through the heating liquid for different periods of time, and separate delivery means for each conveyer.

3. An egg boiler, having in combination, a container for holding a heating liquid, a plurality of endless conveyers of various lengths for carrying said eggs through the heating liquid for different periods of time, and carriers carried by each of said conveyers for each holding an egg.

4. An egg boiler, having in combination, a container for holding a heating liquid, a plurality of endless conveying means of various lengths and provided with carriers for carrying eggs through said heating liquid for different periods of time, and means for positively ejecting said eggs from out of the carriers on said conveyers after the same have been passed through the heating liquid.

5. An egg boiler, having in combination, a container for holding a heating liquid, a plurality of driven sprockets and a plurality of idling sprockets located at various distances from said driven sprockets, endless conveyers each passing over one driven sprocket, and one idling sprocket provided with means for supporting eggs thereon, said conveyers arranged to convey the eggs through said boiling liquid, the longer conveyers exposing the eggs carried thereby to a longer period of time in the heating liquid than the shorter conveyers, and means for delivering said eggs after they are passed through the boiling water to the outside of the conveyer.

In testimony whereof I have affixed my signature.

ERNST SCHEIDIGGER.